US011706008B2

(12) United States Patent
Han et al.

(10) Patent No.: US 11,706,008 B2
(45) Date of Patent: Jul. 18, 2023

(54) ADAPTIVE CHANNEL SOUNDING

(71) Applicant: Hewlett Packard Enterprise Development LP, Houston, TX (US)

(72) Inventors: Jianpo Han, Beijing (CN); Zhenlei Wang, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 111 days.

(21) Appl. No.: 17/244,269

(22) Filed: Apr. 29, 2021

(65) Prior Publication Data
US 2022/0360410 A1 Nov. 10, 2022

(51) Int. Cl.
*H04W 72/044* (2023.01)
*H04L 5/00* (2006.01)

(52) U.S. Cl.
CPC ......... *H04L 5/0055* (2013.01); *H04W 72/044* (2013.01)

(58) Field of Classification Search
CPC .......................... H04L 5/0055; H04W 72/044
See application file for complete search history.

(56) References Cited

U.S. PATENT DOCUMENTS

| | | | |
|---|---|---|---|
| 8,929,474 B2 | 1/2015 | Gao et al. | |
| 9,571,249 B2 | 2/2017 | Bhanage et al. | |
| 9,793,965 B1 * | 10/2017 | Pustovalov | H04B 7/0452 |
| 9,853,701 B1 * | 12/2017 | Pefkianakis | H04B 7/0626 |
| 10,459,076 B2 | 10/2019 | Kravets et al. | |
| 2013/0010632 A1 * | 1/2013 | Wang | H04B 17/309 370/252 |
| 2015/0117325 A1 * | 4/2015 | Ponnuswamy | H04L 5/0048 370/329 |
| 2015/0326340 A1 * | 11/2015 | Huang | H04L 1/0026 375/267 |
| 2016/0036572 A1 * | 2/2016 | Bhanage | H04B 7/0617 370/329 |
| 2019/0140709 A1 | 5/2019 | Guerra et al. | |

FOREIGN PATENT DOCUMENTS

CN 108553108 4/2020

OTHER PUBLICATIONS

Ma, Xiaofu et al., Dynamic Sounding for Multi-User MIMO in Wireless LANs, May 2017, IEEE Transaction on Consumer Electronics, vol. 63, No. 2, 10 Pgs.

* cited by examiner

*Primary Examiner* — Edan Orgad
*Assistant Examiner* — Malick A Sohrab
(74) *Attorney, Agent, or Firm* — Hewlett Packard Enterprise Patent Department

(57) ABSTRACT

In embodiments of the present disclosure, there is provided an approach for channel sounding. According to embodiments of the present disclosure, if the CSI change rate exceeds a first threshold, the AP may disable the beamforming. If the CSI change rate does not exceed the first threshold but exceeds a second threshold below the first threshold, the AP may perform the channel sounding at a first time interval. Otherwise, if the CSI change rate does not exceed the second threshold, the AP may perform the channel sounding at a second time interval. Embodiments of the present disclosure provide an effective way for channel sounding.

20 Claims, 6 Drawing Sheets

ADAPTIVE CHANNEL SOUNDING

BACKGROUND

Beamforming may be used to increase the reliability and/or the range of communication between an access point (AP) and a client or station. For example, the beamforming may include performing channel sounding between the AP and the client. The channel sounding may be performed on a channel between the AP and the client to determine characteristics of a wireless environment in which the AP and the client are deployed. In this case, it would be desirable to implement an effective channel sounding strategy.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
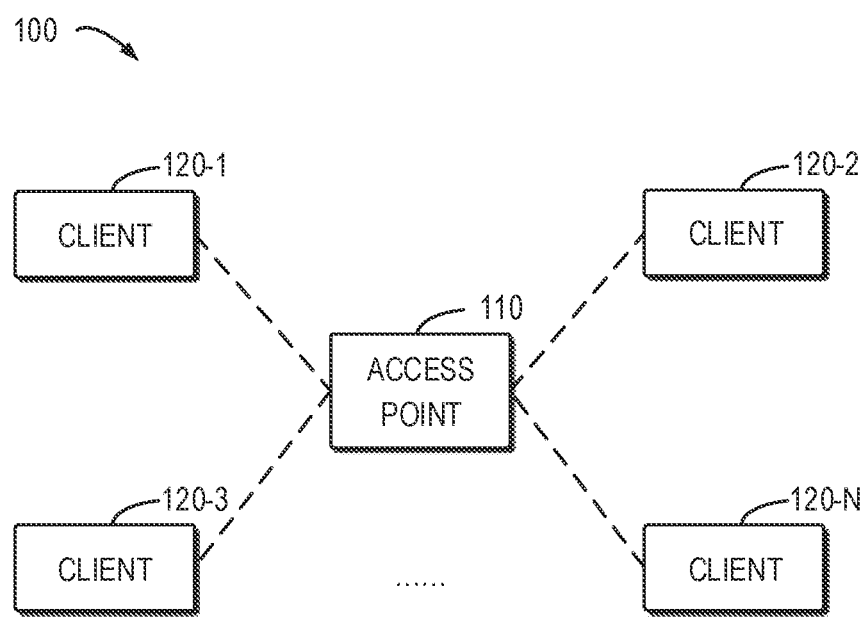
FIG. 1 illustrates an example environment in which embodiments of the present disclosure can be implemented.

Wireless networks may be deployed to provide various types of communication to multiple users through the air using electromagnetic waves. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). WLANs may include multiple stations (STAs) and/or access points (APs) that may communicate over a plurality of wireless channels. As used herein, an AP is a networking hardware device that allows a wireless-compliant device (e.g., a STA) to connect to a network. In the following, the terms "STA" and "client" can be used interchangeably. As used herein, a WLAN generally refers to a communications network that links two or more devices by using some wireless distribution method (for example, spread-spectrum or orthogonal frequency-division multiplexing radio) and usually providing a connection through an access point to the Internet. Thus, a WLAN provides users with the mobility to move around within a local coverage area and still stay connected to the network.

An AP may provide connectivity with a network such as the Internet to the STAs. As used herein, an AP generally refers to a receiving point for any known or convenient wireless technology to be developed in the future. Specifically, the term "AP" is not intended to be limited to Institute of Electrical and Electronics Engineers (IEEE) 802.11-based APs. An AP generally functions as an electronic device that is adapted to allow wireless devices to connect to a wired network via various communications standards. As used herein, a STA or client is a device that has the capability to use the Institute of Electrical and Electronics Engineers (IEEE) 802.11 protocol. Examples of STAs may include, but being not limited to, smart phones, laptops, physical non-virtualized computing devices, personal digital assistants, etc. In some examples, a STA or client may be a device that contains an IEEE 802.11-conformant media access control (MAC) and physical layer (PHY) interface to a wireless medium (WM).

Wireless networks such as WLANs can use one or more wireless communication technologies, for example, orthogonal frequency division multiplexing (OFDM). In an OFDM based wireless network, a data stream is split into multiple data sub-streams. Such data sub-streams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. WLANs such as those defined in the IEEE wireless communications standards. e.g., IEEE 802.11a. IEEE 802.11n. IEEE 802.11ac, etc. can use OFDM to transmit and receive signals. Moreover, WLANs, such as those based on the IEEE 802.11n or IEEE 802.11ac standards, can use OFDM and MIMO.

Beamforming (e.g., explicit transmit beamforming) may be used to increase the reliability and/or range of communication (e.g., a communication link) between an AP and a STA or client. In some examples, beamforming may include performing channel sounding between a beamformer and a beamformee. A beamformer may be a transmitter (Tx), and a beamformee may be a receiver (Rx). For example, a beamformer may be an AP, and a STA may be a beamformee.

Channel sounding may be performed on channel paths between APs and/or STAs to determine characteristics of a wireless environment in which the APs and/or STAs are deployed. Characteristics determined from channel sounding may be calculated and/or reported on a per OFDM subcarrier basis. As used herein, "channel sounding" is a technique that may be used to determine and/or evaluate characteristics of a wireless network. For example, multidimensional spatial-temporal signals may propagate between APs and/or STAs in the wireless environment. Channel sounding may include processing of these multidimensional spatial-temporal signals to estimate and/or evaluate characteristics of the wireless network. These estimated and/or evaluated characteristics may be used to reduce effects of multipath wave propagation in a wireless network.

Channel sounding may be used to recalibrate a beamformer to use altered transmission weights for pre-coding of transmissions to a beamformee. The altered transmission weights may be compatible with conditions associated with a channel between the beamformer and the beamformee.

Beamforming may allow for an increase in a modulation coding scheme (MCS) index value. For example, beamforming may allow for an increase of 1 MCS index value. This increase may correspond to an increase in physical layer (PHY) rates. For example, an increase of 1 MCS index value may correspond to a 10-15% increase in PHY transmission rates. Accordingly, as the number of STAs associated with an AP increases, overhead associated with channel sounding may become greater than increases associated with channel sounding. Further, as the number of APs and/or STAs associated with a particular wireless network increases, interference between the APs and/or STAs may also increase.

Traditionally, beamforming and/or channel sounding may be performed within a static time interval. For example, a specified amount of time may be allocated for performing beamforming and/or channel sounding. This time interval may remain constant regardless of channel conditions between a beamformer and a beamformee. This time interval may be referred to herein as a "beamforming interval" or a "channel sounding interval" depending on whether beamforming or channel sounding is being referenced. However, traditional channel sounding strategies are unaware of environment changes and client behaviors, and thus being unable to adapt to diverse environments.

As a specific example, in a dynamic scenario, the channel between the AP and the client is a fast time-varying channel. For instance, such scenario may be an industrial scenario in which wireless robots, trailers, etc. move fast. In addition, such scenario may also be a scenario in which the AP is mounted at an entrance or a lobby with a lot of clients, obstacles or refractors. Propagation paths or channels between the AP and the clients change with the movement of the clients, obstacles or refractors. In this case, beamforming needs to be performed frequently. Otherwise, beamforming steer matrixes previously trained will not be able to reflect the channel changes. As a result, obsolete steer matrixes will cause high packet error rate (PER) and degrade transmission performance.

In contrast, in a static scenario, since the channel change is small and the steer matrixes remain unchanged, the beamforming does not need to be performed frequently. Actually, channel sounding of the beamforming even becomes a huge overhead. For example, it is assumed that one channel sounding procedure may take up to 0.2 ms, and in a performance setup with 50 clients, a single-user (SU) channel sounding interval at the AP may be 50 ms. In this case, overall SU channel sounding overhead is around 20% (50×0.2 ms×1/50 ms) of airtime. What's worse, because SU channel sounding and multi-user (MU) channel sounding are performed in parallel, the total overhead will be even higher.

It can be seen that the dynamic scenario requires frequent channel sounding, while the static scenario requires infrequent channel sounding for efficiency. However, the traditional channel sounding strategies are just a tradeoff between these two scenarios. As a consequence, the traditional channel sounding strategies are inefficient in both scenarios.

Embodiments of the present disclosure propose a solution for channel sounding, so as to solve the above problems and one or more of other potential problems. This solution enables an AP to perform channel sounding at different time intervals or even disable the beamforming based on the CSI. According to this solution, if the CSI change rate exceeds a first threshold, the AP may disable the beamforming. If the CSI change rate does not exceed the first threshold but exceeds a second threshold below the first threshold, the AP may perform the channel sounding at a first time interval. Otherwise, if the CSI change rate does not exceed the second threshold, the AP may perform the channel sounding at a second time interval. The second time interval exceeds the first time interval. In this way, an adaptive channel sounding can be implemented.

Other advantages of embodiments of the present disclosure will be described with reference to the example implementation as described below. Reference is made below to FIG. 1 through FIG. 6 to illustrate basic principles and several example embodiments of the present disclosure herein.

FIG. 1 illustrates an example environment 100 in which embodiments of the present disclosure can be implemented. As shown in FIG. 1, the environment 100 comprises an AP 110 and a plurality of clients 120-1 to 120-N (collectively referred to as "clients 120" or "STAs 120", where N represents an integer larger than 1). The AP 110 can provide wireless connectivity to the client 120. In order to provide the wireless connectivity, channel sounding (such as, null data packet (NDP) sounding) of beamforming may be performed between the AP 110 and the client 120.

During the channel sounding, a steer matrix for digitally encoding data and steering signals toward a specified direction can be determined. For example, a wireless channel with Multiple Input Multiple Output (MIMO) can be divided into multiple subcarriers by Orthogonal Frequency Division Multiplexing (OFDM). The AP 110 may transmit Long Training Symbols (LTFs), which contain pre-defined symbols for each subcarrier, in the packet preamble. When the LTFs are received, the client 120 may estimate the CSI matrix using the received signals and the original LTFs, and transmit the CSI matrix to the AP 110. Then, the AP 110 can generate the steer matrix using the CSI matrix.

Since the channel sounding is to determine the CSI or the steer matrix based on the CSI, the CSI may be used to optimize the channel sounding. The CSI may characterize how wireless signals propagate from the AP 110 to the client 120 at certain carrier frequencies. The CSI amplitude and phase may be impacted by multi-path effects including amplitude attenuation and phase shift. Each CSI may represent a Channel Frequency Response (CFR). For example, the CSI may describe channel properties such as channel fading, scatter, or signal decay, etc.

The AP 110 can collect CSI of uplink frames received from the client 120, such as acknowledgements (ACKs), block acknowledgements (BAs), data frames, or management frames etc. In some embodiments, the CSI may be collected on the same sub-carriers and use the same transmission mode. For example, it's not allowed to collect the CSI sometimes on a 20 Mhz channel, and sometimes on certain Orthogonal Frequency Division Multiple Access Resource Units (OFDMA RUs). This is because frequency consistency needs to be ensured to estimate the channel changes.

Through analyzing the CSI, the AP 110 can evaluate the channel changes and optimize the channel sounding. Specifically, through analyzing the CSI, the AP 110 can evaluate a channel change trend for the client 120. With the knowledge of the channel change trend, the AP 110 can have deep insight of the channel model of the client 120, so as to choose different channel sounding strategies for different clients 120 accordingly.

In order to implement such adaptive channel sounding, the AP 110 determines, based on frames received from the client 120, the CSI of a channel between the client 120 and the AP 110. As discussed above, the frames may be ACKs, BAs, data frames, or management frames, etc. Then, the AP 110 determines, based on the CSI, a configuration about channel sounding between the AP 110 and the client 120. In some embodiments, the AP 110 may determine, based on the CSI, a CSI change rate of the channel. In this case, the AP 110 may determine the configuration based on the CSI change rate. In some embodiments, the CSI change rate may be determined based on an accumulated CSI change rate or an instantaneous CSI change rate.

In some embodiments, for example, the accumulated CSI change rate can be determined based on the following equation:

$$\text{ACCUMULATED\_CSI\_CHANGE\_RATE}_n = \frac{\|CSI_n - CSI_0\|}{\|CSI_0\|} \times 100\% \quad (1)$$

where $\text{ACCUMULATED\_CSI\_CHANGE\_RATE}_n$ represents the accumulated CSI change rate of the $n^{th}$ frame, $CSI_n$ represents the CSI of the $n^{th}$ frame and $CSI_0$ represents the reference CSI collected at the time when the previous channel sounding being performed.

In some embodiments, for example, the instantaneous CSI change rate can be determined based on the following equation:

$$\text{INSTANTANEOUS\_CSI\_CHANGE\_RATE}_n = \frac{\|CSI_n - CSI_{n-1}\|}{\|CSI_{n-1}\|} \times 100\% \quad (2)$$

where $\text{INSTANTANEOUS\_CSI\_CHANGE\_RATE}_n$ represents the instantaneous CSI change rate of the $n^{th}$ frame, $CSI_n$ represents the CSI of the $n^{th}$ frame and $CSI_{n-1}$ represents the CSI of the $(n-1)^{th}$ frame.

In some embodiments, the CSI change rate may be the accumulated CSI change rate or the instantaneous CSI change rate. Alternatively, in some embodiments, the CSI change rate may be the average of accumulated CSI change rates over a period of time, or the average of instantaneous CSI change rates over a period of time.

Figure 2:
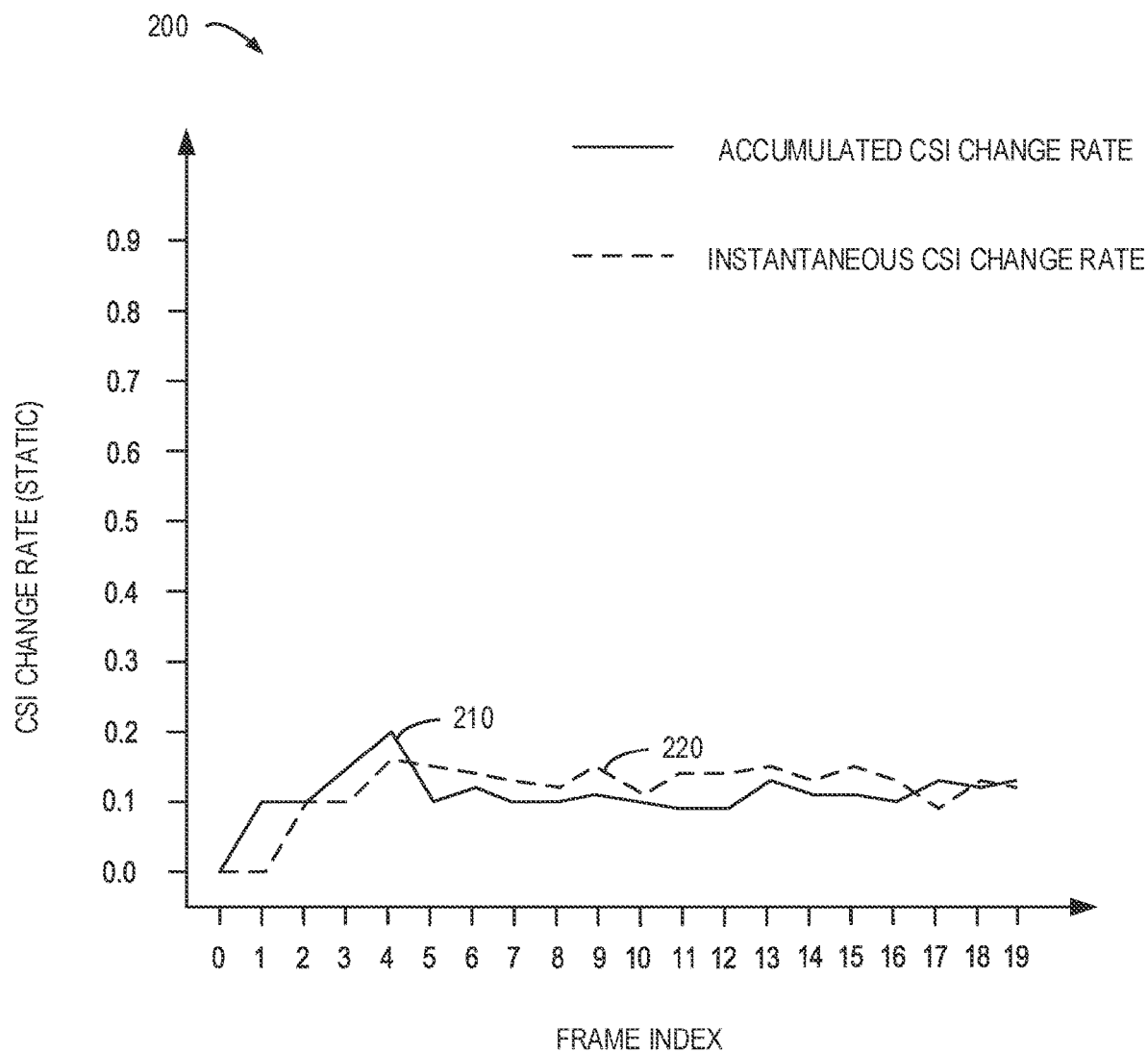
FIG. 2 illustrates a schematic diagram of a channel state information (CST) change rate of a channel between a client and an AP in a static scenario according to embodiments of the present disclosure.
Figure 3:
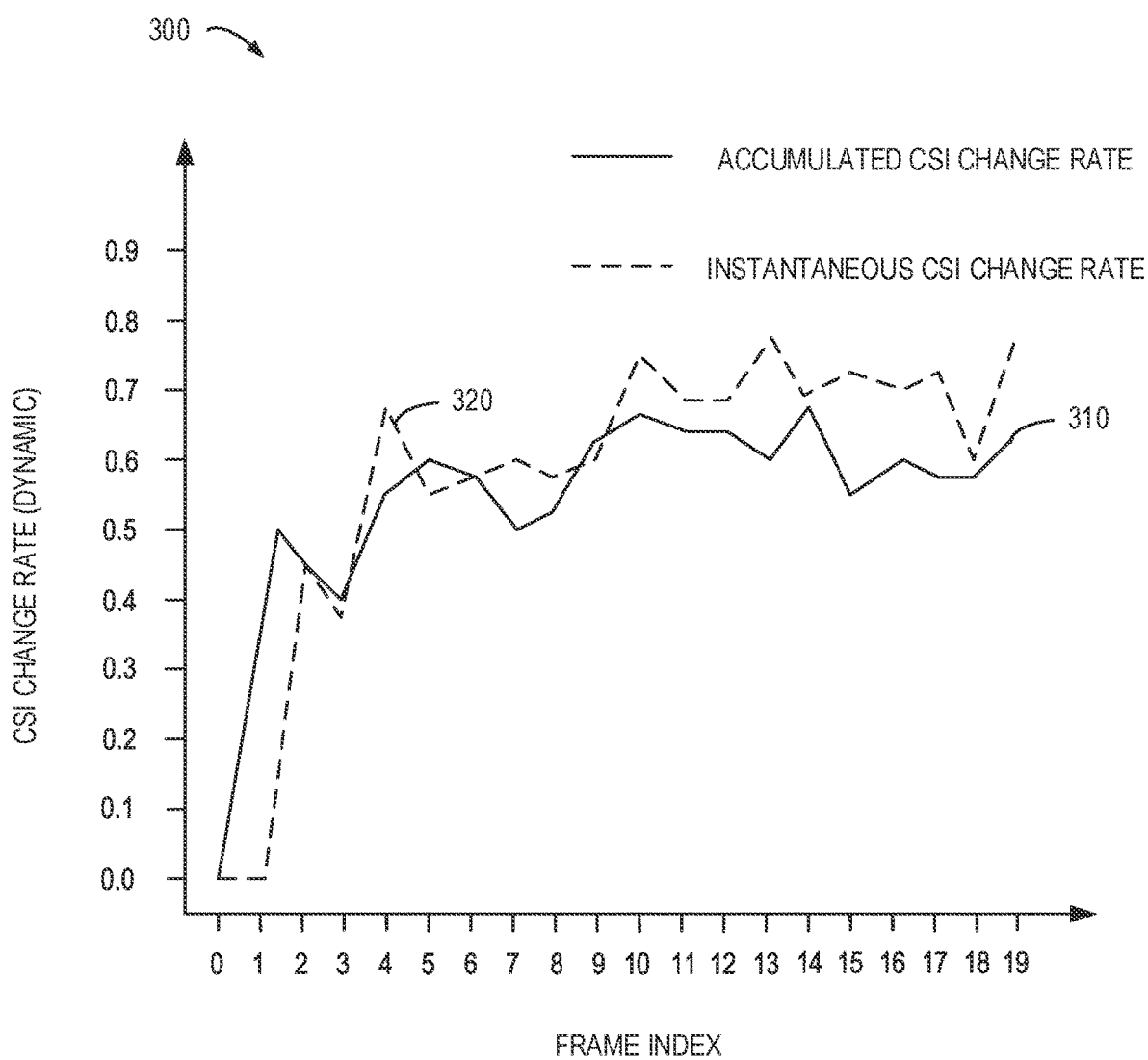
FIG. 3 illustrates a schematic diagram of a CSI change rate of a channel between a client and an AP in a dynamic scenario according to embodiments of the present disclosure.

FIG. 2 and FIG. 3 illustrate schematic diagrams 200 and 300 of CSI change rates of the channel between the client 120 and the AP 110 in a static scenario and a dynamic scenario according to embodiments of the present disclosure, respectively. As shown in FIG. 2 and FIG. 3, in the static scenario (for example, a scenario in which the client 120 is static or slightly moving), the CSI change rate stays at a relatively low level. As can be seen from FIG. 2, the accumulated CSI change rate 210 and the instantaneous CSI change rate 220 each stay at a relatively low level. As a comparison, in the dynamic scenario (for example, a scenario in which the client 120, obstacles or refractors move fast), the CSI change rate stays at a relatively high level. As can be seen from FIG. 3, the accumulated CSI change rate 310 and the instantaneous CSI change rate 320 each stay at a relatively high level.

Since the CSI changes slowly or remains unchanged in the static scenario, for the client 120 with a static channel, the AP 110 may choose a larger channel sounding interval, so as to reduce the channel sounding overhead and improve the transmission performance. On the contrary, for the client 120 with a time varying channel, the AP 110 may choose a smaller channel sounding interval to update the CSI in time.

The faster the channel changes, the more frequent channel sounding may be performed. Further, for the client 120 with an extremely time varying channel, since the CSI determined during the channel sounding may not be able to keep up with the channel change, the AP 110 may even disable the beamforming for this client 120.

Figure 4:
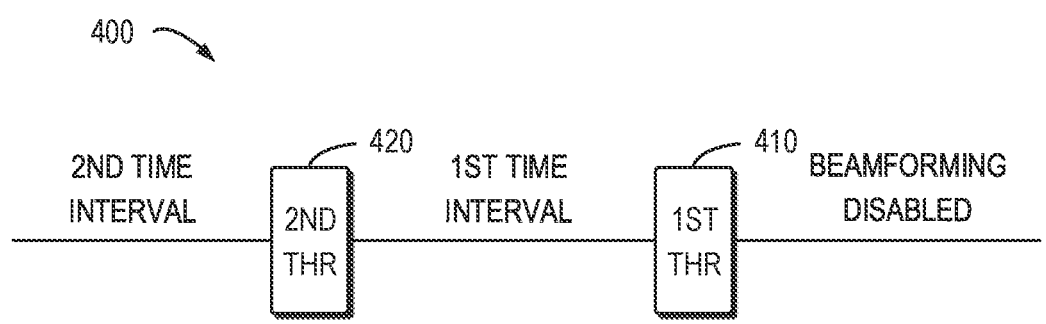
FIG. 4 illustrates a schematic diagram of a configuration about channel sounding between an AP and a client according to embodiments of the present disclosure.

Such adaptive channel sounding interval can be implemented with a configuration about channel sounding between the AP 110 and the client 120. FIG. 4 illustrates a schematic diagram of a configuration 400 about channel sounding between the AP 110 and the client 120 according to embodiments of the present disclosure. As shown in FIG. 4, if the CSI change rate exceeds a first threshold 410, which means the channel between the client 120 and the AP 110 extremely varies with time, the AP 110 may determine the configuration indicating that the beamforming is disabled for the client 120. In this case, the AP 110 may disable the beamforming and/or channel sounding for the client 120.

Otherwise, if the CSI change rate does not exceed the first threshold 410, the AP 110 may determine the configuration indicating that the beamforming is enabled for the client 120. In this event, the AP 110 may perform the channel sounding based on the configuration.

In some embodiments, if the CSI change rate does not exceed the first threshold 410 but exceeds a second threshold 420 below the first threshold 410, which means the channel between the client 120 and the AP 110 varies with time, the AP 110 may determine the configuration indicating a first time interval for performing the channel sounding. In this case, the AP 110 may send channel sounding packets (for example, null data packets) to the client 120 at the first time interval.

Alternatively, if the CSI change rate does not exceed the second threshold 420, which means the channel between the client 120 and the AP 110 changes slowly or remains unchanged, the AP 110 may determine the configuration indicating a second time interval for performing the channel sounding. The second time interval may exceed the first time interval. In this event, the AP 110 may send channel sounding packets (for example, null data packets) to the client 120 at the second time interval.

In addition, besides performing the channel sounding based on the CSI change rate, asynchronous channel sounding may also be triggered when the current channel state deviate far from original channel state. Specifically, in some embodiments, if a difference between the CSI and reference CSI of the channel exceeds a third threshold, the AP 110 may determine the configuration indicating that the beamforming is enabled for the client 120 and the channel sounding is triggered. As discussed above, the reference CSI may be determined when the previous channel sounding being performed. In this event, the AP 110 may send channel sounding packets to the client 120 immediately.

In this way, the channel sounding can be adapted to different scenarios, and the performance of beamforming can be improved.

In addition, as the CSI is determined based on the uplink frames, rather than the beamforming feedback, extra channel soundings for evaluating the channel changes are not required. That is to say, the AP 110 does not need to wait for a channel sounding interval then to know the channel state, and thus be able to promptly and efficiently adapt to the channel changes.

Further, as compared with Received Signal Strength Indicator (RSSI), the CSI is more accurate than the RSSI in many scenarios. For example, when the AP 110 tunes the transmission power, the RSSI is changed, but the channel state is not changed. Instead, the CSI will not be affected by the changing transmission power.

Figure 5:
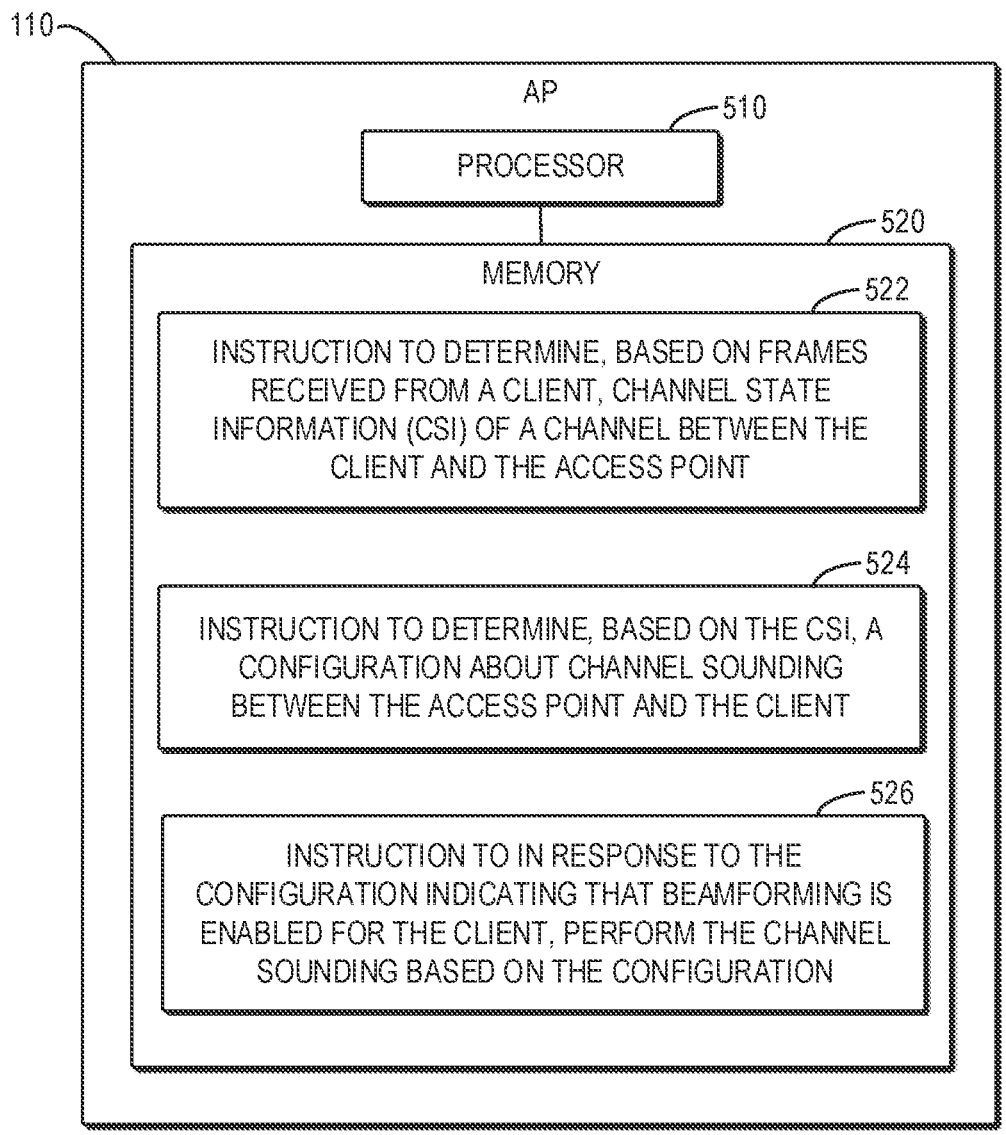
FIG. 5 illustrates an example AP according to embodiments of the present disclosure.

FIG. 5 illustrates an example AP 110 according to embodiments of the present disclosure. The AP 110 comprises a processor 510 and a memory 520 coupled to the processor 510. The memory 520 stores instructions 522, 524 and 526 to cause the processor 510 to perform some acts.

As shown in FIG. 5, the memory 520 stores instruction(s) 522 to determine, based on frames received from a client, channel state information (CSI) of a channel between the client and the access point. In addition, the memory 520 stores instruction(s) 524 to determine, based on the CSI, a configuration about channel sounding between the access point and the client. Further, the memory 520 stores instruction(s) 526 to, in response to the configuration indicating that beamforming is enabled for the client, perform the channel sounding based on the configuration.

In some embodiments, in response to the configuration indicating that the beamforming is disabled for the client, the AP 110 may disable the beamforming and/or channel sounding for the client.

In some embodiments, in order to determine the configuration, the AP 110 may determine, based on the CSI, a CSI change rate of the channel. In accordance with a determination that the CSI change rate exceeds a first threshold, the AP 110 may determine the configuration indicating that the beamforming is disabled for the client. In accordance with a determination that the CSI change rate does not exceed the first threshold, the AP 110 may determine the configuration indicating that the beamforming is enabled for the client.

In some embodiments, in order to determine the configuration, in accordance with a determination that the CSI change rate does not exceed the first threshold but exceeds a second threshold below the first threshold, the AP 110 may determine the configuration indicating a first time interval for performing the channel sounding. In addition, in order to perform the channel sounding based on the configuration, the AP 110 may send channel sounding packets to the client at the first time interval.

In some embodiments, in order to determine the configuration, in accordance with a determination that the CSI change rate does not exceed the second threshold, the AP 110 may determine the configuration indicating a second time interval for performing the channel sounding. For example, the second time interval may exceed the first time interval. In addition, in order to perform the channel sounding based on the configuration, the AP 110 may send channel sounding packets to the client at the second time interval.

In some embodiments, in response to a difference between the CSI and reference CSI of the channel exceeding a third threshold, the AP 110 may further determine the configuration indicating that the beamforming is enabled for the client and the channel sounding is triggered. For example, the reference CSI may be determined in response to previous channel sounding being performed. In addition, in order to perform the channel sounding based on the configuration, the AP 110 may send a channel sounding packet to the client.

In some embodiments, the frames may comprise acknowledgements, block acknowledgements, data frames, or management frames.

Figure 6:
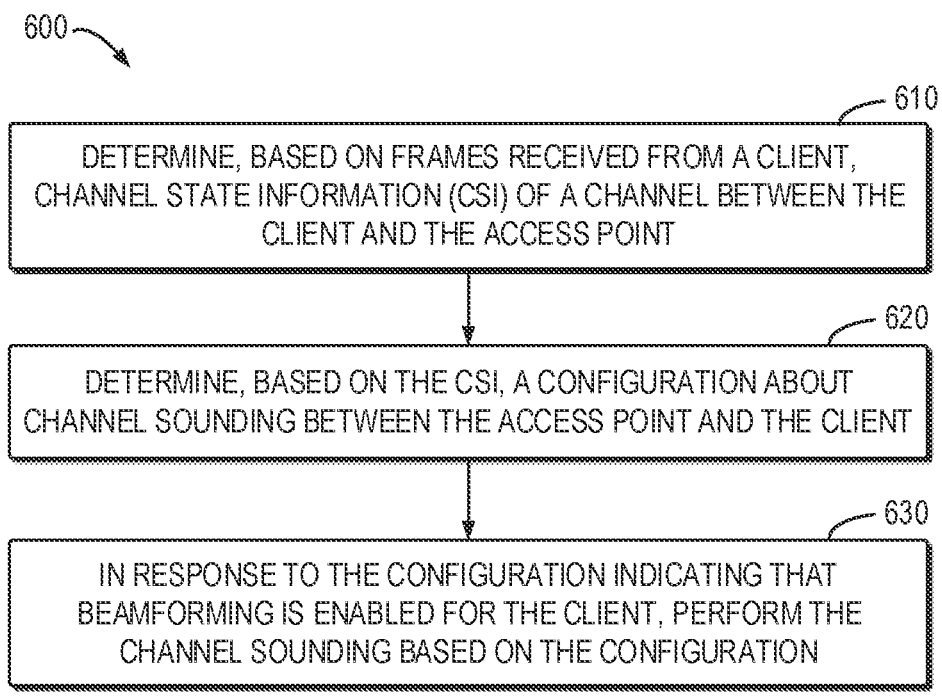
FIG. 6 illustrates a flow chart of an example method for channel sounding according to embodiments of the present disclosure.

FIG. 6 illustrates a flow chart of an example method 600 for channel sounding according to embodiments of the present disclosure. It is to be understood that the method 600 may be executed by the AP 110 as described with reference to FIGS. 1-5.

At 610, the AP 110 determines, based on frames received from a client, channel state information (CSI) of a channel between the client and the access point. At 620, the AP 110 determines, based on the CSI, a configuration about channel sounding between the access point and the client. At 630, in response to the configuration indicating that beamforming is enabled for the client, the AP 110 performs the channel sounding based on the configuration.

In some embodiments, in response to the configuration indicating that the beamforming is disabled for the client, the AP 110 may disable the beamforming for the client.

In some embodiments, in order to determine the configuration, the AP 110 may determine, based on the CSI, a CSI change rate of the channel. In accordance with a determination that the CSI change rate exceeds a first threshold, the AP 110 may determine the configuration indicating that the beamforming is disabled for the client. In accordance with a determination that the CSI change rate does not exceed the first threshold, the AP 110 may determine the configuration indicating that the beamforming is enabled for the client.

In some embodiments, in order to determine the configuration, in accordance with a determination that the CSI change rate does not exceed the first threshold but exceeds a second threshold below the first threshold, the AP 110 may determine the configuration indicating a first time interval for performing the channel sounding. In addition, in order to perform the channel sounding based on the configuration, the AP 110 may send channel sounding packets to the client at the first time interval.

In some embodiments, in order to determine the configuration, in accordance with a determination that the CSI change rate does not exceed the second threshold, the AP 110 may determine the configuration indicating a second time interval for performing the channel sounding. For example, the second time interval may exceed the first time interval. In addition, in order to perform the channel sounding based on the configuration, the AP 110 may send channel sounding packets to the client at the second time interval.

In some embodiments, in response to a difference between the CSI and reference CSI of the channel exceeding a third threshold, the AP 110 may further determine the configuration indicating that the beamforming is enabled for the client and the channel sounding is triggered. For example, the reference CSI may be determined in response to previous channel sounding being performed. In addition, in order to perform the channel sounding based on the configuration, the AP 110 may send a channel sounding packet to the client.

In some embodiments, the frames may comprise acknowledgements, block acknowledgements, data frames, or management frames.

In this way, the channel sounding can be adapted to different scenarios, and thus the performance of beamforming can be improved.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. An access point comprising:
    a processor; and
    a memory coupled to the processor, the memory storing instructions to cause the processor to perform acts comprising:
        determining, based on frames received from a client, channel state information (CSI) of a channel between the client and the access point;
        determining, based on the CSI, a configuration about channel sounding between the access point and the client;
        determining that a difference between the CSI and a reference CSI for the channel between the client and the access point exceeds a threshold;
        based on the difference exceeding the threshold and the configuration about the channel sounding, determining that beamforming is enabled for the client; and
        in response to the configuration indicating that the beamforming is enabled for the client, performing the channel sounding based on the configuration.

2. The access point of claim 1, wherein the acts further comprise:
    in response to the configuration indicating that the beamforming is disabled for the client, disabling the beamforming for the client.

3. The access point of claim 1, wherein determining the configuration comprises:
    determining, based on the CSI, a CSI change rate of the channel;
    in accordance with a determination that the CSI change rate exceeds a first threshold, determining the configuration indicating that the beamforming is disabled for the client.

4. The access point of claim 3,
    wherein determining the configuration comprises:
        in accordance with a determination that the CSI change rate does not exceed the first threshold but exceeds a second threshold below the first threshold, determining the configuration indicating a first time interval for performing the channel sounding; and
    wherein performing the channel sounding based on the configuration comprises:
        sending channel sounding packets to the client at the first time interval.

5. The access point of claim 4,
    wherein determining the configuration comprises:
        in accordance with a determination that the CSI change rate does not exceed the second threshold, determining the configuration indicating a second time interval for performing the channel sounding, the second time interval exceeding the first time interval; and
    wherein performing the channel sounding based on the configuration comprises:
        sending channel sounding packets to the client at the second time interval.

6. The access point of claim 1,
    wherein determining the configuration comprises:
        in response to the difference between the CSI and the reference CSI of the channel exceeding a third threshold, determining the configuration indicating that the beamforming is enabled for the client and the channel sounding is triggered, the reference CSI determined in response to previous channel sounding being performed; and
    wherein performing the channel sounding based on the configuration comprises:
        sending a channel sounding packet to the client.

7. The access point of claim 1, wherein the frames comprise:
    acknowledgements;
    block acknowledgements;
    data frames; or
    management frames.

8. A method comprising:
    determining, at an access point and based on uplink frames received from a client, channel state information (CSI) of a channel between the client and the access point;
    determining, based on the CSI, a configuration about channel sounding between the access point and the client;
    determining that a difference between the CSI and a reference CSI for the channel between the client and the access point exceeds a threshold;
    based on the difference exceeding the threshold and the configuration about the channel sounding, determining that beamforming is enabled for the client; and
    in response to the configuration indicating that the beamforming is enabled for the client, performing the channel sounding based on the configuration.

9. The method of claim 8, further comprising:
    in response to the configuration indicating that the beamforming is disabled for the client, disabling the beamforming for the client.

10. The method of claim 8, wherein determining the configuration comprises:

determining, based on the CSI, a CSI change rate of the channel;
in accordance with a determination that the CSI change rate exceeds a first threshold, determining the configuration indicating that the beamforming is disabled for the client.

11. The method of claim 10,
wherein determining the configuration comprises:
in accordance with a determination that the CSI change rate does not exceed the first threshold but exceeds a second threshold below the first threshold, determining the configuration indicating a first time interval for performing the channel sounding; and
wherein performing the channel sounding based on the configuration comprises:
sending channel sounding packets to the client at the first time interval.

12. The method of claim 11,
wherein determining the configuration comprises:
in accordance with a determination that the CSI change rate does not exceed the second threshold, determining the configuration indicating a second time interval for performing the channel sounding, the second time interval exceeding the first time interval; and
wherein performing the channel sounding based on the configuration comprises:
sending channel sounding packets to the client at the second time interval.

13. The method of claim 8,
wherein determining the configuration comprises:
in response to the difference between the CSI and the reference CSI of the channel exceeding a third threshold, determining the configuration indicating that the beamforming is enabled for the client and the channel sounding is triggered, the reference CSI determined in response to previous channel sounding being performed; and
wherein performing the channel sounding based on the configuration comprises:
sending a channel sounding packet to the client.

14. The method of claim 8, wherein the uplink frames comprise:
acknowledgements;
block acknowledgements;
data frames; or
management frames.

15. A non-transitory machine-readable medium comprising machine-executable instructions that when executed on a device, cause the device to:
determine, based on frames received from a further device, channel state information (CSI) of a channel between the further device and the device;
determine, based on the CSI, a configuration about channel sounding between the device and the further device;
determine that a difference between the CSI and a reference CSI for the channel between the further device and the device exceeds a threshold;
based on the difference exceeding the threshold and the configuration about the channel sounding, determine that beamforming is enabled for the further device; and
in response to the configuration indicating that the beamforming is enabled for the further device, perform the channel sounding based on the configuration.

16. The non-transitory machine-readable medium of claim 15, wherein the device is further to:
in response to the configuration indicating that the beamforming is disabled for the further device, disable the beamforming for the further device.

17. The non-transitory machine-readable medium of claim 15, wherein determining the configuration comprises:
determine, based on the CSI, a CSI change rate of the channel;
in accordance with a determination that the CSI change rate exceeds a first threshold, determine the configuration indicating that the beamforming is disabled for the further device.

18. The non-transitory machine-readable medium of claim 17,
wherein determining the configuration comprises:
in accordance with a determination that the CSI change rate does not exceed the first threshold but exceeds a second threshold below the first threshold, determining the configuration indicating a first time interval for performing the channel sounding; and
wherein performing the channel sounding based on the configuration comprises:
sending channel sounding packets to the further device at the first time interval.

19. The non-transitory machine-readable medium of claim 18,
wherein determining the configuration comprises:
in accordance with a determination that the CSI change rate does not exceed the second threshold, determining the configuration indicating a second time interval for performing the channel sounding, the second time interval exceeding the first time interval; and
wherein performing the channel sounding based on the configuration comprises:
sending channel sounding packets to the further device at the second time interval.

20. The non-transitory machine-readable medium of claim 15, wherein the frames comprise:
acknowledgements;
block acknowledgements;
data frames; or
management frames.

* * * * *